US012574250B2

(12) United States Patent
Schlicher et al.

(10) Patent No.:  US 12,574,250 B2
(45) Date of Patent:       Mar. 10, 2026

(54) METHOD, SYSTEM AND COMPUTER PROGRAM PRODUCT FOR MULTIPLE SIGNATURES AND NOTARIES FOR DIGITAL NOTARIZATIONS

(71) Applicant: AVC Innovations LLC, Spearfish, SD (US)

(72) Inventors: Bob G. Schlicher, Knoxville, TN (US); David J. Todd, Spearfish, SD (US); Niels C. Skjoldager, Seminole, FL (US); Shaikha Dheya Ebrahim Al Khalifa, Manama (BH)

(73) Assignee: AVC INNOVATIONS LLC, Spearfish, SD (US)

( * ) Notice: Subject to any disclaimer, the term of this patent is extended or adjusted under 35 U.S.C. 154(b) by 146 days.

(21) Appl. No.: 18/600,601

(22) Filed: Mar. 8, 2024

(65) Prior Publication Data

US 2025/0023742 A1     Jan. 16, 2025

Related U.S. Application Data

(60) Provisional application No. 63/526,912, filed on Jul. 14, 2023.

(51) Int. Cl.
| | |
|---|---|
| *H04L 9/32* | (2006.01) |
| *G06Q 50/18* | (2012.01) |
| *H04L 9/00* | (2022.01) |

(52) U.S. Cl.
CPC .......... *H04L 9/3247* (2013.01); *G06Q 50/18* (2013.01); *H04L 9/50* (2022.05)

(58) Field of Classification Search
CPC ....... H04L 9/3247; H04L 9/50; H04L 9/3239; G06Q 50/18
See application file for complete search history.

(56) References Cited

U.S. PATENT DOCUMENTS

| | | |
|---|---|---|
| 7,716,619 B2 | 5/2010 | Braceras et al. |
| 9,855,785 B1 | 1/2018 | Nagelberg et al. |

(Continued)

OTHER PUBLICATIONS

ISR & WO from PCT/US 24/ 19448 with four references.

*Primary Examiner* — Patrice L Winder
(74) *Attorney, Agent, or Firm* — Reston Law Group, LLP; Ralph P. Albrecht

(57)          ABSTRACT

A computer-implemented method of automatic event and user-driven event triggers digital notarization on the data and documents on one or more blockchains, according to example embodiments. A method may combine a novel method of additional digital notary functions with existing hash algorithms, digital or electronic signature technologies, secured data or document storage and may add the novelty of assigning notary requirements to a digital asset in a digital dossier. Embodiments may include a digital asset with an aggregation of a digital dossier, notary specification, a notary party group, event-driven automated notary process, a multi-party automated notary process, and a multi-notary notary process. The notary specification may identify the items in the dossier that must, according an example embodiment, apply a notary, signature requirements, and other settings. The method may be applied for the lifecycle of activities for an asset independent of the time duration of the life of the asset.

20 Claims, 4 Drawing Sheets

(56)        References Cited

U.S. PATENT DOCUMENTS

| | | | |
|---|---|---|---|
| 10,505,726 B1 | 12/2019 | Andon et al. | |
| 10,540,654 B1 | 1/2020 | James et al. | |
| 10,614,661 B2 | 4/2020 | Doney et al. | |
| 10,671,712 B1* | 6/2020 | Lindley | G06F 21/60 |
| 10,789,239 B2 | 9/2020 | Ventura et al. | |
| 10,951,409 B2 | 3/2021 | Konda et al. | |
| 10,972,274 B2 | 4/2021 | Redpath et al. | |
| 10,991,185 B1 | 4/2021 | Luthra et al. | |
| 11,038,718 B2 | 6/2021 | Simons | |
| 11,048,788 B2 | 6/2021 | Witchey et al. | |
| 11,070,564 B2 | 7/2021 | McIver et al. | |
| 11,138,580 B1 | 10/2021 | Koch | |
| 11,170,092 B1 | 11/2021 | Liang | |
| 11,171,782 B2 | 11/2021 | Tang et al. | |
| 11,200,569 B1 | 12/2021 | James et al. | |
| 11,553,105 B2* | 1/2023 | Speasl | G06F 21/602 |
| 2004/0221162 A1 | 11/2004 | Kongtcheu | |
| 2009/0077386 A1 | 3/2009 | Simonian | |
| 2010/0138659 A1* | 6/2010 | Carmichael | H04L 9/3263 |
| | | | 726/19 |
| 2016/0283920 A1 | 9/2016 | Fisher et al. | |
| 2017/0046664 A1 | 2/2017 | Haldenby et al. | |
| 2019/0130416 A1 | 5/2019 | Boudville et al. | |
| 2019/0279197 A1 | 9/2019 | Wright et al. | |
| 2019/0319948 A1* | 10/2019 | Triola | H04L 9/3247 |
| 2020/0204377 A1* | 6/2020 | Wisniewski | H04L 9/3247 |
| 2020/0244470 A1* | 7/2020 | Ruckriemen | G06F 21/645 |
| 2020/0280444 A1 | 9/2020 | Tang et al. | |
| 2020/0294128 A1 | 9/2020 | Howard | |
| 2020/0409571 A1* | 12/2020 | Saad | H04L 63/123 |
| 2021/0350389 A1* | 11/2021 | Bautista | G06F 21/64 |
| 2022/0058633 A1 | 2/2022 | Yantis et al. | |
| 2022/0100905 A1* | 3/2022 | Hardy | H04L 9/3247 |
| 2022/0253868 A1 | 8/2022 | Scarseli | |
| 2023/0109544 A1* | 4/2023 | Fletcher | G06Q 50/18 |
| | | | 713/168 |
| 2023/0237200 A1* | 7/2023 | Chitnis | G06F 21/645 |
| | | | 713/193 |
| 2023/0252809 A1* | 8/2023 | Fadzeyeu | G06Q 50/18 |
| | | | 382/103 |

* cited by examiner

200

METHOD, SYSTEM AND COMPUTER PROGRAM PRODUCT FOR MULTIPLE SIGNATURES AND NOTARIES FOR DIGITAL NOTARIZATIONS

BACKGROUND OF THE DISCLOSURE

Field of the Disclosure

This invention relates generally to the notarization of assets, such as data or documents, signed by multiple parties who are validated and authenticated by notaries. And more particularly, the process relates to digital notarization.

Description of the Related Art

Notarization is an established process that affirms to the parties (hereinafter, referred to as users) of a transaction that the asset, data, or documents are authentic, that the signor was vetted, that the data or documents are authentic, and that an official record of an asset, data, or document now exists and is stored for record keeping.

For non-digital notarization, a public official serves as a third party to perform the activities of a notary, such as validating signatures, authenticating the execution of documents, administering oaths, and performing other functions and duties. By utilizing a digital approach, the notary process is conducted with more efficiency and speed by occurring on various mediums such as tablets, computing devices, and mobile phones. A notary public has capabilities to use digital signatures and digital seals for the certification. However, this efficiency can be at the expense of opacity, resulting in uncertainty in the vetting of signatories, and can cause the legitimacy of the documents to be questioned. In both non-digital and digital notarizations, fraud and forgeries persist.

The following is a list of conventional references relevant to Applicants' disclosure, and the contents of each of which, is incorporated herein by reference in their entirety:

The reader is directed to Simonian, entitled "Notary Enforcement-Fraud Prevention," US Patent Publication No. US2009/0077386 A1, published 19 Mar. 2009.

The reader is directed to Tang et al., entitled "Identity and Electronic Signature Verification in Blockchain," US Patent Publication No. US2020/0280444 A1, Published 3 Sep. 2020.

The reader is directed to Fisher et al., entitled "Authentication and Verification of Digital Data Utilizing Blockchain Technology," US Patent Publication No. US2016/0283920 A1, Published 29 Sep. 2016.

The reader is directed to Kongtcheu, Phil, entitled "Method and Systems to Facilitate Online Electronic Notary, Signatures and Time Stamping," US Patent Publication No. US2004/0221162 A1, Published 4 Nov. 2004.

The reader is directed to Boudville et al., entitled "Blockchain, Notary and Linket for Mobile Users," US Patent Publication No. US2019/0130416 A1, published 2 May 2019.

The reader is directed to Nagelberg et al., entitled "Digitally Encoded Seal for Document Verification," U.S. Pat. No. 9,855,785 B1, published 2 Jan. 2018.

The reader is directed to Tang et al., entitled "Identity and electronic signature verification in blockchain," U.S. Pat. No. 11,171,782 B2, published 9 Nov. 2021.

The reader is directed to Redpath et al., entitled "Trusted Identity Solution using Blockchain," U.S. Pat. No. 10,972,274 B2, published 6 Apr. 2021.

The reader is directed to McIver et al., entitled "Electronic Interaction Authentication and Verification, and Related Systems, Devices, and Methods," US Patent No. U.S. Pat. No. 11,070,564 B2, published 20 Jul. 2021.

The reader is directed to Liang, Minya, entitled "Document Authentication Certification with Blockchain and Distributed Ledger Techniques," U.S. Pat. No. 11,170,092 B1, published 9 Nov. 2021.

The reader is directed to Witchey et al., entitled "Content Authentication and Validation via Multi-factor Digital Tokens, Systems, and Methods," U.S. Pat. No. 11,048,788 B2, published 29 Jun. 2021.

SUMMARY OF THE INVENTION

According to one example embodiment of the claimed invention, sets forth a process, system, method and/or computer program product for one or more digital notaries to transpire on a blockchain creating a verifiable immutable record of the notarized data or documents, according an example embodiment. An example feature of the invention is to provide a system and method for multiple digital signatures, criteria for applying the signatures, and notaries for digital notarization(s) that overcome the disadvantages of the systems and methods of this general type and of conventional solutions in the art, according an example embodiment. According to an example embodiment, a system, method, or computer program product of automatic event and user-driven event triggers digital notarization on data and documents on one or more blockchains, according to example embodiments. An embodiment of the method may combine a novel method of additional digital notary functions with existing hash algorithms, digital or electronic signature technologies, secured data or document storage and may add the novelty of assigning notary requirements to a digital asset in a digital dossier. Embodiments may include a digital asset with an aggregation of a digital dossier, notary specification, a notary party group, event-driven automated notary process, a multi-party automated notary process, and a multi-notary notary process. The notary specification may identify the items in the dossier that must, according an example embodiment, apply a notary, signature requirements, and other settings. The method may be applied for the lifecycle of activities for an asset independent of the time duration of the life of the asset.

This present disclosure of a blockchain-based notarization can affirm the legitimacy of the parties' signature on documents, the validity of the documents, the criteria for completing the notarization, and storage of the executed documents, according an example embodiment. Blockchain or distributed ledger technology may provide a more secure method for each event in the transaction using an event-driven automated process defined by the users, including computing a hashtag value for the asset, data, or document with a unique identifier, storing new records in a secured and encrypted location, enabling signature for multiple notaries including within a private or local blockchain and a public blockchain, and evaluating the criteria for completing the notarization, according an example embodiment.

According an example embodiment, an example platform that may involve a set of pre-determined events that may be assigned by users to authorize notarization of assets by more than one platform, according an example embodiment. An asset, hereinafter can be referred to as data or document, is physical or digital, to be selected for notarization after gaining all required signatures, meeting the conditions for completing the notarization (including addressing all notary requirements), and then assigning to the notary, according an example embodiment. Examples of physical assets may include, e.g., but not limited to, escrow payments, power of attorneys, medical authorizations, bill of sale; while example of digital assets include tokens, representations of digital twins with physical assets, digital documents, digital media, software code, data in databases, visual engineering diagrams, according an example embodiment. A digital asset may be in the following formats, for example, digital file or files in an image, text, binary format, and other digital formats, according an example embodiment, according an example embodiment.

In one aspect of this invention, a user utilizes a computing device and through the graphical or command user interface upload or transfer an asset to a computing device, such as personal computer, laptop, smart device, tablet, and any similar user devices that connect to the internet, according an example embodiment. These assets may be placed within the private storage, which may hold a collection of data, documents, and records, referred to as dossier, according an example embodiment.

The users can have a role of administrator or owner, member or non-member of a local system, signatory, or signor, or be the system, according an example embodiment. In performing this invention, technology and software may include but not limited to computing and input devices, biometric scanners, digital interactive system through a graphical user interface (GUI), and may also include events specified for self-execution or can be described as instructions, such as actions necessary by particular users, records stored on the blockchain, according an example embodiment. The system as described herein as local or private; in this embodiment, the system is developed for specific purpose that is available to other approved users, who may be described as member and authorization can be granted to nonmembers to access the system, according an example embodiment. A system can consist of multiple components, including a blockchain which will act as the first notary, and other vessels for data storage and data collection, according an example embodiment. The automation occurs from predetermined events that may be specified and held with a collection of records, hereinafter referred to as digital dossier or dossier, in the private or local system, according an example embodiment. For example, events may include requirements for user verification, a user's authentication to approve notarization on blockchain, requirements for signature of user, determining if more than one notary, requirements for authenticating a user, generating new data fields for signatures, according an example embodiment. The smart contract provides the business logic for the events, sequence of events, and recordation on blockchain, according an example embodiment.

According to an example embodiment of the invention, the embodiment may integrate signatures from multiple users and allows for more than one notary performed on a blockchain using an event-driven automated notary process, according an example embodiment. In addition to the notary specifications, the dossier may include the data and documents in which none, some, or all may require notarization; the notary specification articulates, e.g., but not limited to, the signatories, the credentials for verification and authentication of the user to authorize the first notary, review to ensure that a single notary is sufficient and if so then a second notary may be provided as an additional option, or if a single notary is not sufficient or an optional additional notary is desired, a transition of records to the public blockchain for a second (or optional additional) notary, transmission to or storage of records on various distributed ledgers, and other events programmed as determined by the involved users, according an example embodiment.

Users will receive a prompt through the Application Programming Interface (API) to digitally sign the data or document, according an example embodiment. The prompt can be in the form of an email or message that provides a description for action, a URL link to navigate by browser, or by their phone to a user interface page, according an example embodiment. The user interface page can require them to authenticate their identity and then gain access to review and digitally sign, according an example embodiment. However, only users designated with status to activate data or documents to be notarized by the blockchain will have proper credentials when vetted, according an example embodiment.

In another embodiment, the users can prescribe additional data or documents for notarization, in addition to the standard or typical documents, according an example embodiment. Although the location of the dossier is not described in detail herein, it is one of the components of the private or local system, according an example embodiment. In most cases the location may be a private or encrypted location not on a blockchain where the user employs a web user interface to upload, submit or transmit asset, data or document, according an example embodiment.

The data or document can be accessible by verified users thereby enabling multiple signatures with only credentialed users elected to authorize notarization of the signed data or documents, according an example embodiment. In each case to transmit data or document for notarization on the blockchain, the signatory's identity has been verified, their signatory status confirmed, and authenticated and authorized for the notary, according an example embodiment.

The following are some examples of methods that can be employed, according to one example embodiment, to verify and authenticate a user's identity and their role, according an example embodiment. These methods may be a representation and other methods may be used to distinguishes user's authority to cross the cryptographic boundary to gain access to a blockchain for notarization and storage of new records or blocks, according an example embodiment. A key pair is assigned to a user prior to commencing the transaction on the blockchain after their identity is verified, according an example embodiment. In one embodiment, a signatory can use public electronic profile accounts or system account, for example Google, Facebook to authenticate the signatory via the federated authentication, according an example embodiment. Another embodiment may include that a signatory is supplied with a key pair after verification of their identity using the platform, according an example embodiment. Their identity is verified by the platform through login and password access that can be supplemented with two-factor authentication that requires a code sent to their phone to be provided at the login prompt, according an example embodiment. In another embodiment, the signatory provides password, code from a multi-factor authenticator (MFA), biometric scans, passcode, or signature factor, like geo location, according an example embodiment. In another embodiment, a signatory's decentralized global identity can be used to verify their identity or authenticate their signatory status, according an example embodiment.

And a user's digital signature is applied in a cryptographic manner after inspecting their unique identifier or credentials, according an example embodiment. With each new signature to the data or document, a new record is generated that includes the unique identifier for the document, the hash value and meta data, plus the signor's identification and signature, according an example embodiment. In one embodiment, each new record is saved as a block and added to the distributed ledger, such as a private blockchain, and this process repeats for each new signature with each new entry linked together forming a virtual single record, according an example embodiment. In another embodiment, all the signatures may be obtained, saved to a temporary record in an off-chain data storage, and when the final record is added, all the records may be gathered together forming a single record of the aggregated data and saved to the blockchain for notarization, according an example embodiment.

A signature data field is a position in the document for the digital signature to be applied, according an example embodiment. In one embodiment, pre-existing fields may be added to the record when the record is created for the distributed ledger, according an example embodiment. The identities for the signors may be added as slot fields in the record, according an example embodiment. After a user has digitally signed, their signature is saved in their assigned slot field of the document, according an example embodiment. In one embodiment, the creator of the system may store the document in its private or within the system with all the documents aggregated in the dossier as a zip file or file folder in the storage location, according an example embodiment.

In one embodiment, once the data or document is notarized, the meta data which is inclusive of the unique identifier (URI), hash value, time stamp, other values, and the digital signature in a cryptographic manner may be all aggregated to generate a new record stored on the blockchain, according an example embodiment. These contents of this new record can be copied and returned to the user for their own storage and record keeping, if specified, and the new record remains in the blockchain permanently and immutably, according an example embodiment.

The hash value is based on the algorithm preferred by users and available to be applied, such as, e.g., but not limited to, SHA-256, SHA-512 and others, according an example embodiment. The unique identified can be created by processes currently available in this field of cryptography and distributed ledgers, according an example embodiment.

Another point of novelty of this invention is multiple digital notaries, according an example embodiment. With a new record created after each signature, the signature is added to the existing latest Record consisting of all the other signatures, according an example embodiment. This process is accounted for in the notary specification for a copy of the latest record to be retrieved from the system's storage location or from the blockchain and the signature is applied combined with the unique identifier, meta data, and hash vale to generate a new record on the ledger, according an example embodiment. This process repeats for each signatory, according an example embodiment.

In this invention the notary's signature can represent approval, disapproval, concurrence, decline, or another representation of acknowledge of the data, document or record using the same process as mentioned above, according an example embodiment. Therefore, another data field is added to the record to indicate concurrence or decline, according an example embodiment. The data or document is digitally signed to indicate the user's required participation combined with their choice of representation, according an example embodiment.

The uniqueness of this invention, a record can receive more than one notarization, which provides further assurances of the authenticity of the assets, such as data, documents, or records, according an example embodiment. The second notary occurs using a remote notary service, like a publicly available blockchain Hedera Consensus Network, other blockchain, but not limited to these aspects, according an example embodiment.

In another embodiment of this invention, the digital signature process can be performed manually, with a user inserting their data related to their identification, according an example embodiment. Additionally, the signature can be applied as an event from dossier specifications, according an example embodiment. The affixation of a preapproved and verified signature in circumstances when conditions may be met in the specifications, according an example embodiment. This user has the authority to activate the submission of records to the blockchain for notarization, according an example embodiment. This user's signature in the database of a private or local system has limited permissions to contents in the digital dossier, such as only access for documents designated as requiring notary services, according an example embodiment. The assignment to a system signature proxy is a separate transaction, whereby the Party's assignment for the signature authority is recorded as a separate transaction in the blockchain distributed ledger, according an example embodiment.

The summary detailed above is not intended to be an exhaustive representation of every embodiment or aspect of this invention, according an example embodiment. Instead, the summary provides a mere example and description of concepts and features set forth in this invention, according an example embodiment. The features, concepts, and summary in combination with the diagrams, provide representative modes to carry out this disclosure, according an example embodiment. This disclosure expressly includes any and all combinations and sub-combinations of the elements and features presented above and below, according an example embodiment.

The construction and method of operation of the invention and additional objects and advantages of the invention is best understood from the following description of specific embodiments when read in connection with the accompanying drawings, according an example embodiment.

According to one example embodiment, a computer implemented method of processing multiple signatures and notaries for digital notarization may include at least one electronic computer processor coupled to at least one electronic memory storage device and coupled via at least one communications network interface to at least one data communications network, the method may include: electronically receiving, by the at least one electronic computer processor, at least one transaction update or electronic request to notarize data or a document; electronically authenticating, by the at least one electronic computer processor, identity of a requestor of the electronic request by accessing at least one database of signatures of authorized users; electronically verifying, by the at least one electronic computer processor, a notary authorization status of the requestor; electronically determining, by the at least one electronic computer processor, if the requestor is authenticated and authorized, based on the electronically authenticating and the electronically verifying, and if so, performing a plurality of processing instructions comprising at least one or more of: computing, by the at least one electronic computer processor, a hash value for the data or the document; assembling and generating, by the at least one electronic computer processor, metadata for the data or the document; receiving, by the at least one electronic computer processor, an electronic signature for an approved user for transmittal of the data, the hash and the metadata to a blockchain for a notary; combining and saving, by the at least one electronic computer processor, the hash, the electronic signature, and the metadata as a record; determining if the data or the document are to be saved, and if determined to be saved, then performing: a) notarizing, by a local private system, the data or the document via the electronic signature and adding a new record to a private blockchain, and b) saving, by the at least one electronic computer processor, the data or the document with the electronic signature and the metadata in secure storage; or if determined not to be saved proceeding; and determining, by the at least one electronic computer processor, if the data or the document are assigned for an external notary, and if determined to be for an external notary, then performing: a) generating, by the at least one electronic computer processor, a transaction request including a record in the contents, b) transmitting, by the at least one electronic computer processor, a transaction request to remote notarization, c) authenticating, by the at least one electronic computer processor, identity of the requestor for the transaction, and d) determining, by the at least one electronic computer processor, if the requestor is authenticated and authorized, and if so then performing, by the at least one electronic computer processor, a digital notarization process on the record, comprising: verifying, by the at least one electronic computer processor, remote notarization at the requestor with the remote notarization identifier from the response, and saving, by the at least one electronic computer processor, the remote notarization identifier with the record, and if not then generating and transmitting, by the at least one electronic computer processor, a transaction response indicating denial, saving, by the at least one electronic computer processor, a denial status message with the record; or if determined not to be for the external notary, then immediately continuing; generating, by the at least one electronic computer processor, a transaction response with contents of the identifiers for the first and second notary if required, and status; and transmitting, by the at least one electronic computer processor, the transaction response to the requestor, according to one example embodiment.

According to one example embodiment, a system of processing multiple signatures and notaries for digital notarization, the system may include: at least one electronic computer processor, coupled to at least one electronic memory storage device and coupled via at least one communications network interface, coupled to at least one data communications network, the system may include where the at least one electronic computer processor is configured to: electronically receive at least one transaction update or electronic request to notarize data or a document; electronically authenticate identity of a requestor of the electronic request by accessing at least one database of signatures of authorized users; electronically verify a notary authorization status of the requestor; electronically determine if the requestor is authenticated and authorized, based on the electronically authenticate and the electronically verify, and if so, configured to perform a plurality of processing instructions comprising being configured to at least one or more of: compute a hash value for the data or the document; assemble and generate metadata for the data or the document; receive an electronic signature for an approved user for transmittal of the data, the hash and the metadata to a blockchain for a notary; combine and save the hash, the electronic signature, and the metadata as a record; determine if the data or the document are to be saved, and if determined to be saved, then being configured to perform: a) notarize, by a local private system, the data or the document via the electronic signature and adding a new record to a private blockchain, and b) save the data or the document with the electronic signature and the metadata in secure storage; or if determined not to be saved proceeding; and determine if the data or the document are assigned for an external notary, and if determined to be for an external notary, then being configured to perform: a) generate a transaction request including a record in the contents, b) transmit a transaction request to remote notarization, c) authenticate identity of the requestor for the transaction, and d) determine if the requestor is authenticated and authorized, and if so then perform digital notarization process on the record, may include: verify remote notarization at the requestor with the remote notarization identifier from the response, and save the remote notarization identifier with the record, and if not then generate and transmit a transaction response indicating denial, save a denial status message with the record; or if determined not to be for the external notary, then immediately continue; generate a transaction response with contents of the identifiers for the first and second notary if required, and status; and transmit the transaction response to the requestor, according to one example embodiment.

According to yet another example embodiment, a computer program product embodied on a computer accessible nontransitory storage medium, including at least one instruction, which when executed on at least one electronic computer processor performs a method of processing multiple signatures and notaries for digital notarization may include: electronically receiving at least one transaction update or electronic request to notarize data or a document; electronically authenticating identity of a requestor of the electronic request by accessing at least one database of signatures of authorized users; electronically verifying a notary authorization status of the requestor; electronically determining if the requestor is authenticated and authorized, based on the electronically authenticating and the electronically verifying, and if so, performing a plurality of processing instructions comprising at least one or more of: computing a hash value for the data or the document; assembling and generating metadata for the data or the document; receiving an electronic signature for an approved user for transmittal of the data, the hash and the metadata to a blockchain for a notary; combining and saving the hash, the electronic signature, and the metadata as a record; determining if the data or the document are to be saved, and if determined to be saved, then performing: a) notarizing, by a local private system, the data or the document via the electronic signature and adding a new record to a private blockchain, and b) saving the data or the document with the electronic signature and the metadata in secure storage; or if determined not to be saved proceeding; and determining if the data or the document are assigned for an external notary, and if determined to be for an external notary, then performing: a) generating a transaction request including a record in the contents, b) transmitting a transaction request to remote notarization, c) authenticating identity of the requestor for the transaction, and d) determining if the requestor is authenticated and authorized, and if so then performing a digital notarization process on the record, comprising: verifying remote notarization at the requestor with the remote notarization identifier from the response, and saving the remote notarization identifier with the record, and if not then generating and transmitting a transaction response indicating denial, saving a denial status message with the record; or if determined not to be for the external notary, then immediately continuing; generating a transaction response with contents of the identifiers for the first and second notary if required, and status; and transmitting the transaction response to the requestor, according to one example embodiment.

According to one example embodiment, the method, system, or computer program product may further include electronically initiating based on at least one or more of: at least one automatic event trigger, or at least one user-driven event trigger, the at least one digital notarization of the data or document on the at least one or more blockchains.

According to one example embodiment, the method, system, or computer program product may further include at least one digital notary function comprising at least one or more of: at least one hash algorithm, at least one digital signature technology, at least one electronic signature technology, at least one secured data storage, or at least one secured document storage; and electronically assigning at least one notary requirement to at least one digital asset in a digital dossier.

According to one example embodiment, the method, system, or computer program product may further include at least one or more of: at least one digital asset; at least one digital dossier; at least one notary specification; at least one notary party group; at least one event-driven automated notary process; at least one multi-party automated notary process; or at least one multi-notary notary process.

According to one example embodiment, the method, system, or computer program product may include where the at least one notary specification comprises at least one or more of: electronically identifying at least one item in the at least one digital dossier that applies a notary, applies signature requirements, or applies other notary specification settings; electronically applying at least one or more of: the at least one notary specification for a lifecycle of activities for the at least one digital asset, or the at least one notary specification independent of a time duration of a life of the at least one digital asset.

According to one example embodiment, the method, system, or computer program product may include where the digital notarization comprises at least one or more of: electronically affirming legitimacy of signatures of parties on the document, electronically affirming validity of the document, electronically ensuring the at least one criteria for completing the notarization are followed, electronically ensuring the conditions for completing the notarization have been completed, wherein the conditions are programmed within a Smart Contract that comprise criteria comprising at least one or more of: a number of signatures required to be complete, or a numeric proportion of total number of signatures necessary to be complete, electronically storing of the executed document, or using an electronic blockchain or distributed ledger technology to electronically provide at least one or more of: a secure electronic method for each event in the transaction; an event-driven automated electronic process defined by the users; electronically computing a hashtag value for the asset, data, or document with a unique identifier; electronically storing new records in a secured and encrypted location; electronically enabling signature for multiple notaries including within a private or local blockchain and a public blockchain; and electronically evaluating the criteria for completing the notarization.

BRIEF DESCRIPTION OF THE VARIOUS EXAMPLE VIEWS OF THE DRAWINGS

This present disclosure will be fully understood with reference to the following detailed description when taken in conjunction with the figures, herein:

Figure 3:
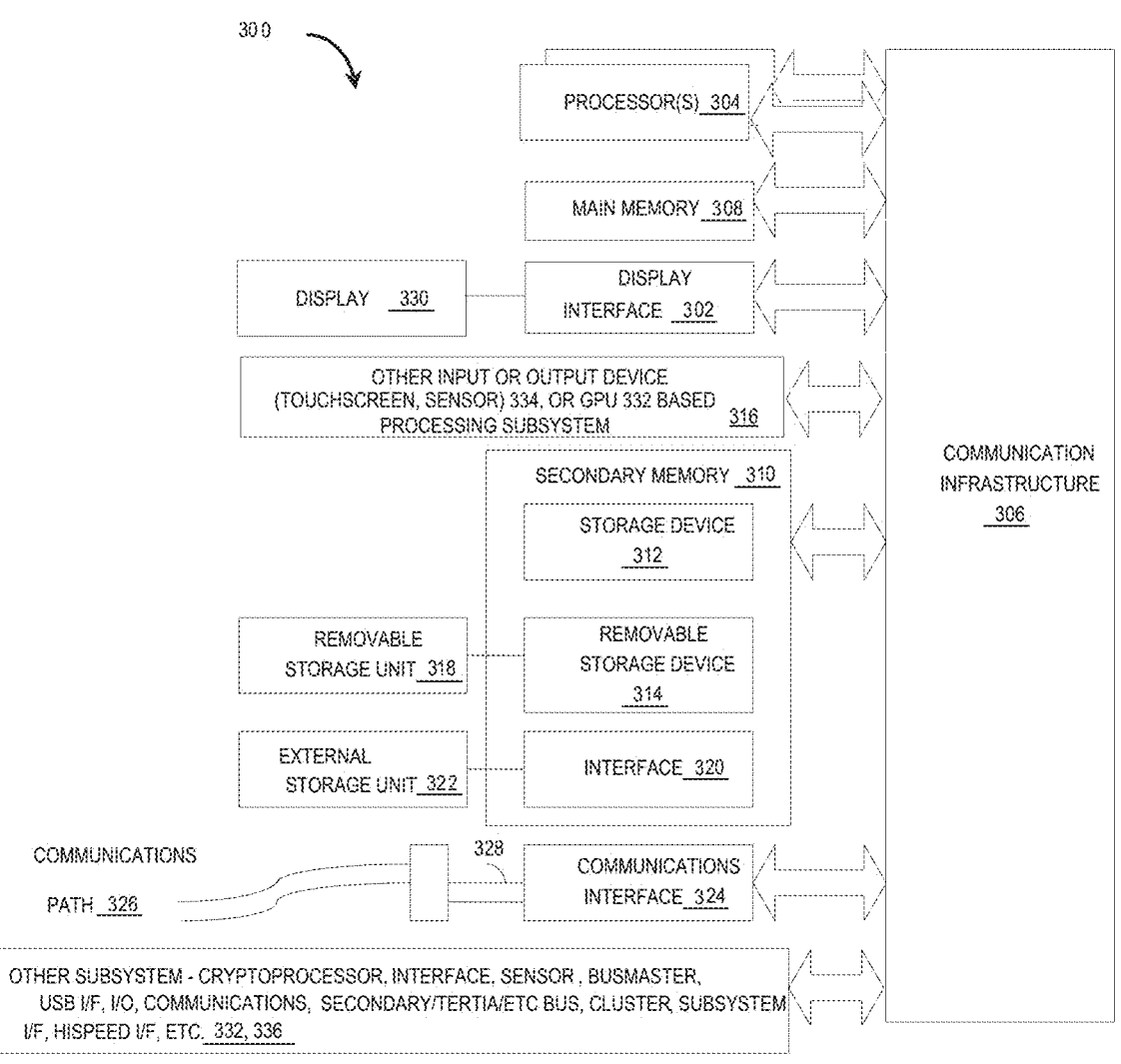
Figure 4:
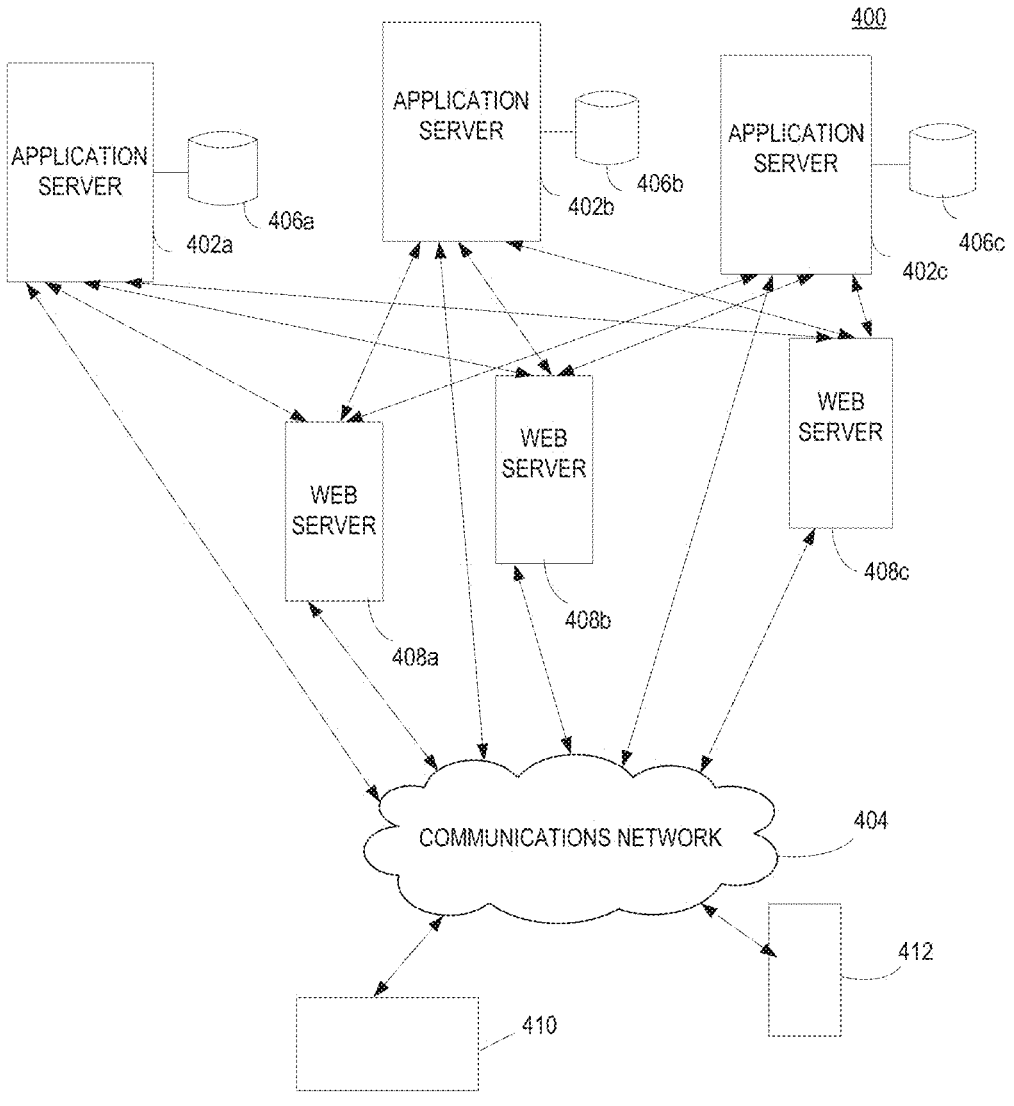

FIG. 3 depicts an example embodiment of an example component level example hardware architecture for an example computing device as may be used for any of various example hardware subsystem components of an example system, according to one example embodiment; and FIG. 4 depicts an example embodiment illustrating an example system level hardware architecture for an example application server, web server embodiment of an example service provider system for providing an example software architecture of various example subsystem components of an example networking system, which may be used to implement, according to one example embodiment.

DETAILED DESCRIPTION OF THE INVENTION

The various embodiments of the invention described herein should not be limited to the description, even with reference to the accompanying figures and drawings depicted, but only with respect to the claims. The invention may be embodied in different forms and should not be restricted as set forth here.

The various embodiments of the invention described herein should not be limited to the description, even with the reference to the accompanying figures and drawings depicted herein. The invention may be embodied in different forms and should not be restricted at set forth, according an example embodiment. The following provides a logical view of the system, according an example embodiment.

The flowchart and block diagrams in the figures illustrate the architecture, functionality, and operation of possible implementations of systems, methods, and computer program products according to various embodiments of the present invention, according an example embodiment. In this regard, each block in the flowchart or block diagrams may represent a module, segment, or portion of code, which comprises one or more executable instructions for implementing the specified logical function(s), according an example embodiment. It should also be noted that, in some alternative implementations, the functions noted in the block may occur out of the order noted in the figures, according an example embodiment. For example, two blocks shown in succession may, in fact, be executed substantially concurrently, or the blocks may sometimes be executed in the reverse order, depending upon the functionality involved, according an example embodiment. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions, according an example embodiment.

Figure 1:
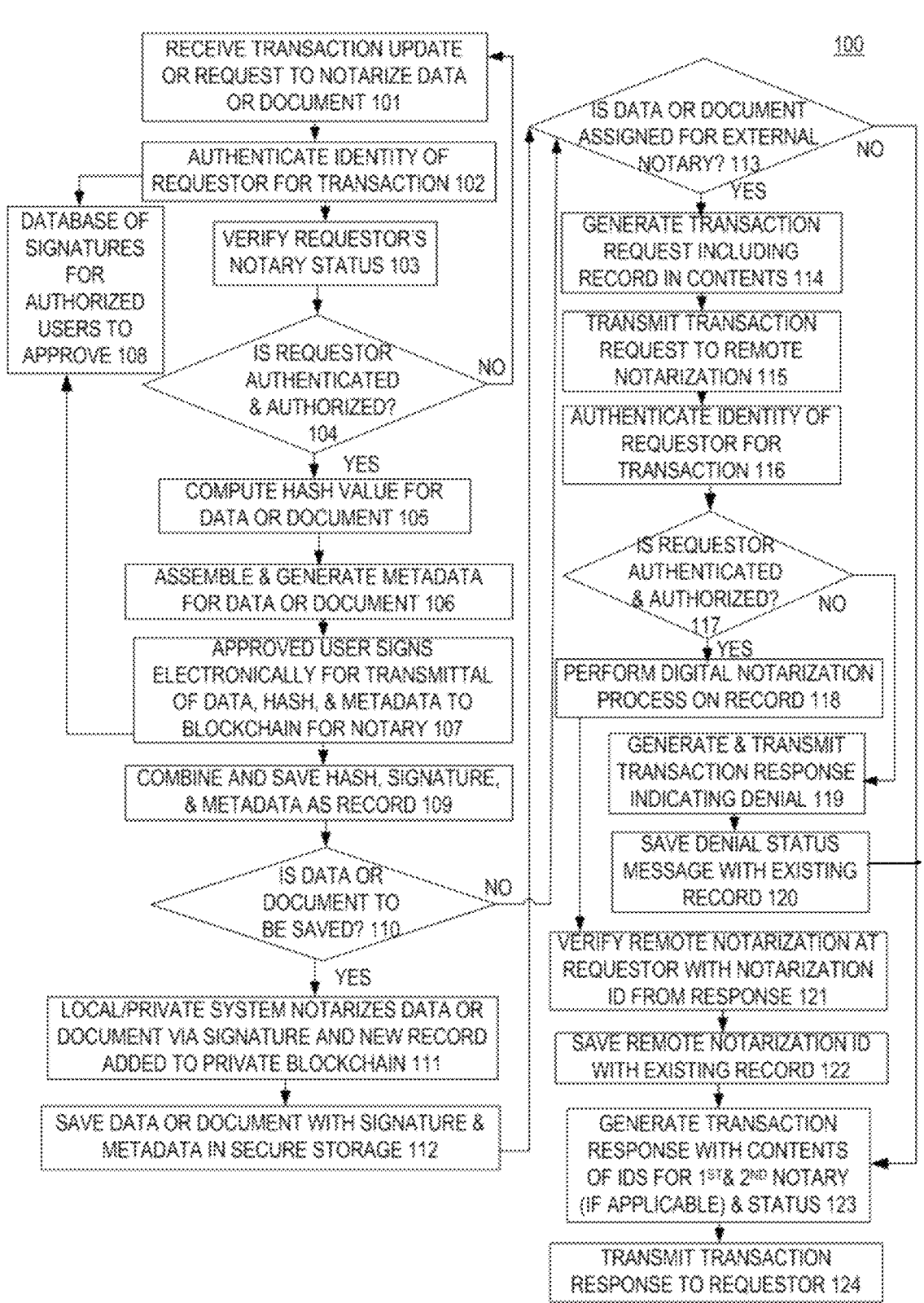
FIG. 1 is a flowchart showing a method according to the invention, according an example embodiment.

FIG. 1 is a flowchart 100 showing a method according to the invention, according an example embodiment.

FIG. 1 illustrates a flow diagram 100 of the module executed for multiple digital notarization of a document, data, or assets, and hereinafter referred to as either data or document, according an example embodiment. Notarization of documents or data is based on the specification within the digital dossier, according an example embodiment. This FIG. 1 of diagram 100 may also describe an example of the example parties, process and information flow within the example system and that notarization can be described as the user or system's signature on the data or document, according an example embodiment.

After all the data or documents have been accumulated with the digital dossier, which may have been submitted or transmitted to the dossier by an administrator or owner, notary, member, or non-member, and hereinafter referred to as user, of the private blockchain system, according an example embodiment. One of the specifications of the dossier may include a label for identifying which documents need notarization, including single or multiple notarizations, according an example embodiment.

According to an example embodiment, a system, method, or computer program product of automatic event and user-driven event triggers may initiate digital notarization on the data and documents on one or more blockchains, according to example embodiments. The method may provide additional digital notary functions with example hash algorithms, digital or electronic signature technologies, secured data, or document storage and may add assigning notary requirements to a digital asset in a digital dossier. Embodiments may include a digital asset with an aggregation of a digital dossier, notary specification, a notary party group, event-driven automated notary process, a multi-party auto-mated notary process, and a multi-notary notary process, according to an example embodiment. The notary specification, according to one example embodiment, may identify the items in the dossier that must, according an example embodiment, apply a notary, apply signature requirements, and other settings. The method may be applied for the lifecycle of activities for an asset independent of the time duration of the life of the asset, according an example embodiment.

According to one example embodiment, the method, system, or computer program product may further include electronically initiating based on at least one or more of: at least one automatic event trigger, or at least one user-driven event trigger, the at least one digital notarization of the data or document on the at least one or more blockchains.

According to one example embodiment, the method, system, or computer program product may further include at least one digital notary function comprising at least one or more of: at least one hash algorithm, at least one digital signature technology, at least one electronic signature technology, at least one secured data storage, or at least one secured document storage; and electronically assigning at least one notary requirement to at least one digital asset in a digital dossier.

According to one example embodiment, the method, system, or computer program product may further include at least one or more of: at least one digital asset; at least one digital dossier; at least one notary specification; at least one notary party group; at least one event-driven automated notary process; at least one multi-party automated notary process; or at least one multi-notary notary process.

According to one example embodiment, the method, system, or computer program product may include where the at least one notary specification comprises at least one or more of: electronically identifying at least one item in the at least one digital dossier that applies a notary, applies signature requirements, or applies other notary specification settings; electronically applying at least one or more of: the at least one notary specification for a lifecycle of activities for the at least one digital asset, or the at least one notary specification independent of a time duration of a life of the at least one digital asset.

According to one example embodiment, the method, system, or computer program product may include where the digital notarization comprises at least one or more of: electronically affirming legitimacy of signatures of parties on the document, electronically affirming validity of the document, electronically ensuring the at least one criteria for completing the notarization are followed, electronically ensuring the conditions for completing the notarization have been completed, wherein the conditions are programmed within a Smart Contract that comprise criteria comprising at least one or more of: a number of signatures required to be complete, or a numeric proportion of total number of sig-natures necessary to be complete, electronically storing of the executed document, or using an electronic blockchain or distributed ledger technology to electronically provide at least one or more of: a secure electronic method for each event in the transaction; an event-driven automated elec-tronic process defined by the users; electronically computing a hashtag value for the asset, data, or document with a unique identifier; electronically storing new records in a secured and encrypted location; electronically enabling sig-nature for multiple notaries including within a private or local blockchain and a public blockchain; and electronically evaluating the criteria for completing the notarization. The notary specification can depend on the region and/or juris-diction for which digital notarization is intended, and the specification can include a number of rules and require-ments, which can be hardcoded into an example smart contract, along with all requirements of what must be completed, such as, e.g., but not limited to, number of signatures required, proportion of total number of signatures necessary to be complete, whether a signature must be notarized, the number of notarized signatures, the require-ments of a notary, the location of the signatory, the location of the notary, etc. For example, a state, like the Common-wealth of Virginia of the United States may have its own notarization rules for physical and digital notarization. For example, the National Notary Association of www.nation-alnotary.org requires five example steps to notarize, for example, requiring: 1) personal appearance of the signatory before the notary, 2) checking the document, 3) carefully identifying the signer, 4) record a journal entry of the notarization, and 5) completing the notarial certificate. Some states have authorized remote notarization, for example, in the United States, 47 states have passed remote notarization laws, including Alabama, Alaska, Arizona, Arkansas, Cali-fornia, Colorado, Connecticut, Delaware, District of Colum-bia, Florida, Hawaii, Idaho, Illinois, Indiana, Iowa, Kansas, Kentucky, Louisiana, Maine, Maryland, Massachusetts, Michigan, Minnesota, Missouri, Montana, Nebraska, Nevada, New Hampshire, New Jersey, New Mexico, New York, North Carolina, North Dakota, Ohio, Oklahoma, Oregon, Pennsylvania, Rhode Island, South Dakota, Ten-nessee, Texas, Utah, Vermont, Virginia, Washington, West Virginia, Wisconsin, Wyoming, and each state's rules may differ, and each countries rules may differ too, so according ton an example embodiment, all relevant rules must be determined before a digital notarization is deemed complete, according to an example embodiment.

Flow diagram 100 may begin, according to one example embodiment, with 101, according to one example embodi-ment.

In 101, the module may begin when an API's prompt is received by the user as set forth in 101 which may originate from the example system, and when complete, flow diagram 100 may continue with 102, according an example embodi-ment. Because the user has provided their login and access password, and possibly other required identification mechanisms to identify themselves that may include, e.g., but not limited to, two factor code authentication, cryptographic key-pair exchange, federated identification, and other factor authentication such as, e.g., but not limited to, biometrics, etc., their identity may be authenticated by the private or local system as set forth in 102, where identity of requestor of transaction may be authenticated, according an example embodiment. The authentication of identity of the requestor for the transaction of 102 may access a database of signatures of authorized users to approve 108, according to one embodiment. In 102, access to a database of signatures for authorized users to approve 108 may be accessed, according to one example embodiment, and from database 108, flow diagram may also provide access to the database, and/or provide the database to 107, according to one example embodiment. Once confirmed, the user may transition through the cryptographic boundary into the private blockchain hereinafter referred to as the system's blockchain, according an example embodiment. The system may check the user's credentials, and determine if the user is approved for access of the data or documents as set forth in 102, and when complete, flow diagram 100 may continue with 103. In 103 flow diagram 100 may verify the status to determine the Requestor's notary status, i.e., eligibility to notarize the documents or data, as set forth in 103, and when complete, flow diagram 100 may continue with 104, according an example embodiment. The user may hold one of the various roles, such as non-member, member, signor, notary, administrator, according an example embodiment.

In 104, according an example embodiment, additionally, authentication and authorization of the user may occur as, e.g., but not limited to, an example two-step process as set forth in 104 for the user's signature to be applied as a notary of the data or documents or data on the blockchain, and when complete, flow diagram 100 may continue with 105 if authorized/authenticated, or with 101 if the requestor is not authenticated and authored, according an example embodiment. The example two-step process can include methods such as, e.g., but not limited to, an authenticator, email, code sent to a phone, tablet, or digital user interface, etc., according an example embodiment. If the user is denied, then user will have the ability to submit appropriate credentials for authentication with the private or local system for authentication for first notary 102, according an example embodiment.

If the user is approved in 104, then the system generates a hash value, e.g., with a timestamp 105, from 106, flow diagram 100 may continue with 106, and the meta data may be assembled and/or generated 106 for the document or data, from 106, flow diagram 100 may continue with 107, according an example embodiment. A new record may be created in 107, an approved user signs electronically for transmittal of data, hash, and meta data to blockchain for notary, 107, when the user signs electronically; this represents notarized data or document that includes the metadata with the hash value 105 and assembled or generated meta data of 106, and from 107, flow diagram 100 may continue with 109, according an example embodiment.

Alternatively, the user can give approval with their digital signature 107 by predetermined events held within the dossier, for example it would be similar to applying a preestablished automatic signature from the system database 108, according an example embodiment. The database may be secured within the private or local system, in this embodiment, which may be called a SmartHub System in compliance with cyber security for protecting privacy data that may further include, e.g., but not limited to, cryptographic data for digital signatures of users who have already been verified, authenticated, and authorized before this transaction, from 108, flow diagram 100 may continue with 107, according an example embodiment.

A signature may be applied when the data or document is ready for signature as shown in 107, according to an example embodiment, as triggered by the parameters of the smart contract, from flow diagram 107, flow diagram 100 may continue with 109, according an example embodiment. Unlike other example inventions, the signature can be affixed at any location on the data or document and may not be limited to a signature block and/or particular field, etc., according an example embodiment. All users of the proxy signature, according an example embodiment, must decrypt with their key for approval as requirement for submission of crypto-signature to the database 108, according an example embodiment.

The option to save can be stipulated in the dossier specifications or a prompt after the new record is created, in 109, the flow diagram may combine and save a hash, signature, and meta data as a record, and from 109, flow diagram 100 may continue with 110, according an example embodiment.

In 110, it may be determined whether the data or document are to be saved, and if yes, then flow diagram may continue with 111, or if not to be save, flow diagram may continue with 113, according to one example embodiment. If specified in the dossier, then the data or document with the notarized signature may be returned to the user for storage in the user's designated location, and/or in most cases this storage location may be outside of the private blockchain, according an example embodiment. Following that prompt, the system may automatically apply its electronic signature as set forth in 111 to the record, which may include the meta data added in 109, and from 111, flow diagram may continue to 112, where, as shown in 100.

In 111, local/private system may notarize the data or document via a signature and new record may be added to the public blockchain, in one example embodiment. From 111, flow diagram may continue with 112, where the data or document may be saved along with the signature and metadata in secure storage, so the notarized data or document may be saved to the system's secured location in 112. From 112, flow diagram 100 may continue with 113, according an example embodiment. This record may be applied as an entry onto the private blockchain of the system, according one example embodiment.

As shown, in 113, the flow diagram 100 may determine if the data or document is assigned for an external notary, and if assigned, may continue with 114, or if not assigned, then may continue with 126, according to one example embodiment.

Unlike other notaries, this invention may enable multiple notaries of a document by transmitting an already notarized document to, e.g., but not limited to, a publicly available blockchain, such as, e.g., but not limited to, Hedera, etc., for notarization under their process, according an example embodiment. The publicly available blockchain may be described herein after as remote notary, according an example embodiment. The system may send a digital message, like a JSON message to the remote notary as may be illustrated in 113, according an example embodiment. If more than one notary is provided for in the dossier specification or if the system prompts for another notary, then the system may from 113 proceed to 114 to generate a transaction request including a record in the contents, as shown in 114 and may proceed from 114 to 115, to transmit in 115 a transaction request to a remote notary as illustrated, for remote notarization, in which the request may include the file of the notarized data or document with meta data, and from 115, flow diagram 100 may continue with 116, according an example embodiment.

In 116, the remote notary may require verification of the system's identity using pre-determined credentials, i.e., authenticating an identify of the requestor for the transaction as illustrated, such as, e.g., but not limited to, a cryptographic secret-key, a secured access token, or public-private key exchange, etc., which may confirm that the transaction request was accepted by the remote notary in 116. From 116, flow diagram may continue with 117.

In 117, according an example embodiment, it may be determined if the requestor is authenticated and authorized and if so, flow diagram may continue with 118, or if not, then flow diagram 100 may continue with 119.

In 118, if the identification in 117 was verified, then a remote notary may notarize the already notarized file using its own process, such as, e.g., but not limited to, a digital notarization process may be performed on the record, as illustrated, and from 118, flow diagram 100 may continue as illustrated by connector A by continuing with 122, according an example embodiment.

In 119, if the identity of the system is not confirmed in 117, then flow diagram 100 may continue in 119 to generate and/or transmit a transaction response indicating denial, as illustrated, e.g., the requestor may receive a denial message from the remote notary and from 119 flow diagram 100 may continue with 120, according an example embodiment.

In 120, flow diagram 100 may save a denial status message with the existing record, and the denial transaction may be documented as a new record that may be coupled with the file, e.g., but not limited to, the file that was transmitted to the notary, and from 120, flow diagram 100 may continue with 126, according an example embodiment.

In 121, flow diagram 100 may verify remote notarization at requestor with the notarization identification from the response, and/or after the remote notary completes their notarization process, the notary may send to the system a unique identifier for the new record which may be the data or document with the additional notary, and from 121 flow diagram 100 may continue with 122, according an example embodiment.

This notarization may include, e.g., but not limited to, a hash value, meta data, and a new transaction identifier according to an example embodiment, and from 121 flow diagram 100 may continue with 122, according an example embodiment. Verifying the identifier value in 121, may include e.g., but not limited to, using a comparison, according an example embodiment. The comparison of 121 may include being performed by accessing the new record from the remote notary and may include retrieving that data or documents, and comparing that data or documents with the data in the local system from the first notary and ensuring identical values, according an example embodiment.

In 122, the system may save the unique identifier along with the file, e.g., as a new record, e.g., but not limited to, onto the private blockchain and this new record data on the public blockchain notary may be accessible by other users who have been authorized 122, according an example embodiment. The remote notarization identifier may be saved with the existing record, according to one embodiment, and from 122, flow diagram 100 may continue with 123.

In 123, a transaction response may be generated with contents of identifiers for the first and/or second notary (if applicable), and status, and from 123, may continue with 124, in 1 thehe smart contract within the blockchain may generate a transaction response as illustrated in 123 and may transmit to the administrator/owner the transaction response that may include the identifier values for each of the notaries, and from 123, flow diagram may continue with 124, where the transaction response may be transmitted to requestor as shown, according an example embodiment, and from 124, flow diagram 100 may end, according to one example embodiment.

Figure 2:
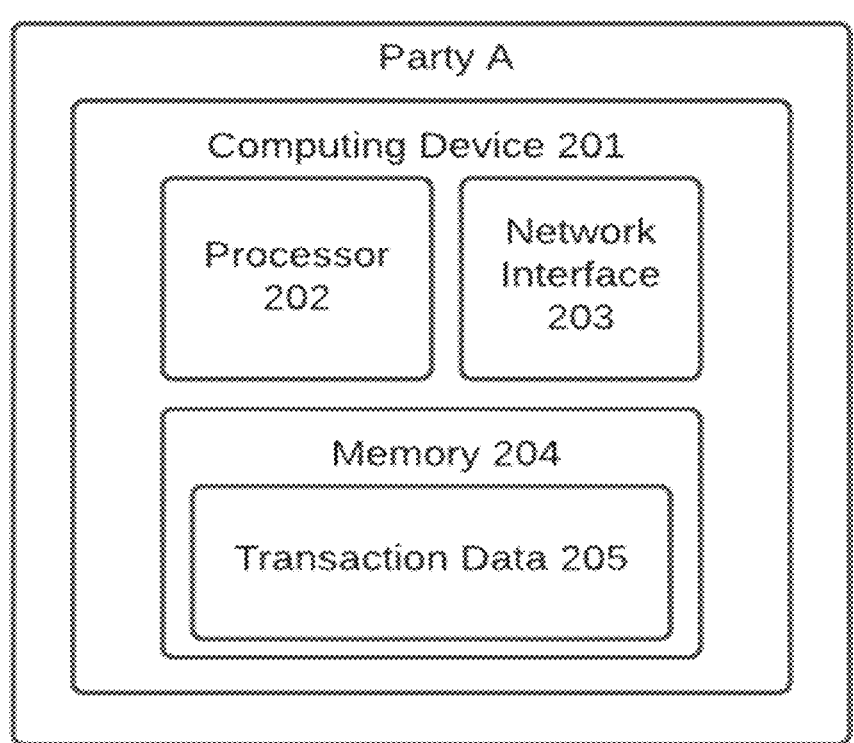
FIG. 2 is a schematic view of a system according to the invention, according an example embodiment.

FIG. 2 is a schematic view 200 of an illustrative system, which may include a system of an example user party A as illustrated (although it could also represent a party B or other other, etc.), and system 200 may include a computing device 201, which may include one or more processor(s) 202, one or more network interface(s) 203, and may include a memory 204 and/or transaction data 205, which may be stored in memory device 204, or may be stored in an example removable memory device (not shown) 204a, and the data 205 may be acted upon by one or more operations and/or other processing instructions, which may be executed in processor 202, and an example embodiment of the system 100 is described further with reference to FIG. 3A, according to the invention, according an example embodiment.

FIG. 2 depicts the computing and software platform and infrastructure diagram 200, according an example embodiment.

Referring to diagram 200, a user of Party A (which could alternatively be of a different party and/or user), may include a computing device 201, for example, a personal computer, laptop, tablet, smart phone, smart wearable device, server, cloud computing system, or any other computing device that may be used to submit or settle transactions between the users, according an example embodiment. The computing device 201 may include at least one processor 202 (which may include, e.g., but not limited to, an electronic computer processor, a mobile device processor, microcontroller, a system on a chip (SOC), etc.), memory 203 (which may include, e.g., but not limited to, an electronic computer memory storage device, a mobile device memory storage device, a removable memory storage device, a local and/or a remote storage device, etc.)), and a network interface 204 (which may include, e.g., but not limited to, an electronic computer network interface, a mobile device network interface, an electronic network interface, and optical network interface, a wireless network interface, a wired network interface, an Ethernet interface, a token ring interface, and FDDI interface, a gigabit ethernet interface, a high speed network interface, a Wi-Fi network interface, a WiMax interface, a LAN interface, a WAN interface, etc.), according an example embodiment. The processor 202 may include, for example, a microcontroller, field programmable gate array (FPGA), application specific integrated circuit (ASIC), and/or any other processor that is configured to perform various operations, according an example embodiment. The processor 202 may be configured to execute software instructions, according an example embodiment. These instructions may be stored, for example, in memory 204, according an example embodiment.

The memory 204 may include, for example, non-transitory computer readable media in the form of volatile memory, such as random-access memory (RAM) and/or cache memory or others, according an example embodiment. And may include, for example, other removable/non-removable, volatile/nonvolatile storage media, according an example embodiment. By way of non-limiting examples only, memory 204 may include, e.g., but not limited to, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, according an example embodiment.

Network interface 203 is configured to transmit and receive data or information between the users via wired or wireless connections, according an example embodiment. For example, network interface 203 may utilize wireless technologies and communication protocols such as Bluetooth, WIFI (e.g., but not limited to, 802.11a/b/g/n), cellular networks (e.g., but not limited to, CDMA, GSM, M2M, and 3G/4G/4G LTE/5G, etc.), nearfield communications (NFC) systems, satellite communications, or any other form of communication that may allow computing device 202 to transmit or receive information, according an example embodiment. Network interface 203 may allow computing device 202 to communicate directly with computing devices associated with one or more users, according an example embodiment. In some aspects, e.g., but not limited to, network interface 203 may communicate computing devices of other users via an intermediary network, such as, e.g., but not limited to, a local area network (LAN), wide area network (WAN), the Internet, or other similar networks, etc., according an example embodiment.

In some aspects, users may store transaction data 205 in the memory 204, according an example embodiment. Transaction data 205 may include, for example, an identification of any transactions that may be currently pending for a user, an amount or value associated with the pending transactions, and an identification of other users for each transaction, according an example embodiment. In some aspects, transaction data may also include an indication of whether the users for each transaction is a fully-trusted or verified user or a fully un-trusted or verified user, according an example embodiment. For example, transaction data 205 may be a registry of all pending transactions for a user, according an example embodiment.

The aspects of the present invention may take the form of an entirely hardware embodiment, an entirely software embodiment (including firmware, resident software, microcode, program code) or an embodiment combining software and hardware aspects that may be referred to herein as a "module" or "system," according an example embodiment. Furthermore, aspects of the present invention may take the form of a computer program product embodied in one or more computer readable medium(s) having installed computer readable program code, according an example embodiment.

Any combination of one or more computer readable medium(s) may be utilized, according an example embodiment. A computer readable storage medium may be, for example, an electronic, magnetic, optical, electromagnetic, infrared, or semiconductor system, apparatus, or device, or any suitable combination of the foregoing, according an example embodiment. More specific examples (a non-exhaustive list) of the computer readable storage medium would include the following: a portable computer diskette, a thumb disk, a hard disk, a cloud storage, a random access memory (RAM), a read-only memory (ROM), a solid state Disk (SSD) or nonvolatile memory (NVMe), an erasable programmable read-only memory (EPROM or Flash memory), a portable compact disc read-only memory (CD- ROM), an optical storage device, a magnetic storage device, or any suitable combination of the foregoing, according an example embodiment. In the context of this document, a computer readable storage medium may be any tangible medium that can contain or store a program for use by or in connection with an instruction execution system, apparatus, or device, according an example embodiment.

Program code installed on a computer readable medium may be transmitted using any appropriate medium, including, e.g., but not limited to, as example wireless, wire cable, optical fiber cable, RF, etc., according an example embodiment, or any suitable combination of the foregoing, according an example embodiment.

Computer program code for carrying out operations for aspects of the present invention may be written in any combination of one or more programming languages with a subset example of object-oriented, procedural, and other forms as, e.g., but not limited to, Python, Go, Java, JavaScript, C++, C, etc., and scripting languages including, e.g., but not limited to, operating system level shells, according an example embodiment. The program code may execute entirely on the user's computer, partly on the user's computer, as a stand-alone software package, partly on the user's computer and partly on a remote computer or entirely on the remote computer or server, according an example embodiment. In the latter scenario, the remote computer may be connected to the user's computer through any type of network, including, e.g., but not limited to, a local area network (LAN) or a wide area network (WAN), or the connection may be made to an external computer (for example, through the Internet using an Internet Service Provider), according an example embodiment.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks, according an example embodiment.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks, according an example embodiment.

FIG. 3 depicts an example embodiment of a hardware architecture block diagram 300 for an example computing or communications device as may be used for any of various example buyer devices, example seller devices, example financial institution devices, example nonfungible token (NFT) devices, notification and/or authentication devices, example SmartHub devices, cryptocurrency exchange devices, as well as example computing devices of users, mobile devices, network communication components, routers, gateways, etc., according to an example embodiment of the present invention.

FIG. 3 depicts an exemplary schematic block diagram 300 illustrating an exemplary computer/communications device hardware architecture as may be used in various exemplary components of an exemplary embodiment including user devices various example buyer devices, example seller devices, example financial institution devices, example non-fungible token (NFT) devices, notification and/or authentication devices, example SmartHub devices, cryptocurrency exchange devices, as well as example computing devices of users, mobile devices, network communication components, routers, gateways, etc., computer device(s), bank devices, merchant devices, payment service provider devices, other computing or communications devices, routers, application servers, web servers, cloud-based computing devices, communication devices, switches, routers, gateways, telephone devices, mobile devices, content servers, web servers, database servers and/or other application servers, enduser devices, operations center devices, client and/or server devices, network routers, gateways, access points, and the like, according to various exemplary embodiments.

FIG. 3 depicts an exemplary schematic block diagram 300 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments. Diagram 300 may include any of various exemplary computer systems as may be used as an external computing device, an internal and/or STB or SOC, a mobile device, a wearable, a client, or server, web server, application server, and/or any other of the computing devices included in the other drawings, according to various exemplary embodiments. FIG. 3 depicts an exemplary diagram 300 illustrating an exemplary computer/communications device hardware architecture as may be used in various components of exemplary embodiments of the present invention. FIG. 3 depicts an exemplary view 300 of exemplary computer systems such as those represented in FIGS. 1-2, 4, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements 101-113, 201-205, 300, 400, etc., as may be used in implementing an exemplary embodiment of the present invention. FIG. 3 depicts an exemplary embodiment of a computer system that may be used in computing devices including those shown and not shown, such as, e.g., but not limited to, service provider computing devices, SmartHub systems, buyer computing devices, supplier computing devices, digital financial services computing devices, public blockchain for proxy nft computing devices, data repository processing and/or storage computing devices, network devices, communication devices, authentication devices, notification devices, requesting devices, response devices, cryptocurrency exchange related devices, NFT related devices, traditional financial services and/or fiat currency processing computing devices, electronic funds transfer (EFT) related devices, network monitoring and analysis devices of example operations illustrated example environment 400, computing devices 300, devices, servers, application servers, web servers, other wearable and/or mobile devices, sensor capture devices, routers, gateways, data network communication equipment, according to an exemplary embodiment of the present invention. FIG. 3 depicts an exemplary embodiment of a computer system that may be used as client device, a server device (not shown), a network component, router, packet monitor/analyzer, server device, storage, and/or cloud based storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 300 is shown in FIG. 3, depicting an exemplary embodiment of a block diagram of an exemplary computer system useful for implementing the present invention. Specifically, FIG. 3 illustrates an example computer 300, which in an exemplary embodiment may be, e.g., (but not limited to) a personal computer (PC) system running an operating system such as, e.g., (but not limited to) WINDOWS MOBILETM for POCKET PC, or MICROSOFT® WINDOWS® NT/98/2000/XP/CE/7/8/10, etc. available from MICROSOFT® Corporation of Redmond, Wash, U.S.A., SOLARIS® from SUN® Microsystems of Santa Clara, Calif, U.S.A, OS/2 from IBM® Corporation of Armonk, N.Y, U.S.A, Mac/OS, Mac OSX, IOS, from APPLE® Corporation of Cupertino, Calif, U.S.A, etc., or any of various versions of UNIX® (a trademark of the Open Group of San Francisco, Calif, USA) including, e.g., LINUX®, UBUNTU, HPUX®, IBM AIX®, and SCO/UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 300 is shown in FIG. 3. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 3.

The computer system 300 may include one or more processors, such as, e.g., but not limited to, processor(s) 304, which may include microprocessors, coprocessors, nanoprocessors, microcontrollers, systems on a chip (SOC), multiprocessor systems, parallel processors, CISC type processors, RISC type processors, POWER type processors, ARM-architecture processors, massively parallel processor, graphic processors (GPUs) 332, cryptographic processors such as, e.g., but not limited to, encryption/decryption processor 336, quantum computers, etc. The processor(s) 304 may be connected to a communication infrastructure 306 (e.g., but not limited to, a communications bus, crossover bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 300 may include a display interface 302 that may forward, e.g., but not limited to, graphics, text, and other data, etc., from the communication infrastructure 306 (or from a frame buffer, etc., not shown) for display on the display unit 330, and/or GPU 332, and/or touchscreen 334, and/or other input or output, and/or input and output device, sensor-based device, etc.

The computer system 300 may also include, e.g., but may not be limited to, a main memory 308, random access memory (RAM), and a secondary memory 310, etc. The secondary memory 310 may include, for example, (but not limited to) a hard disk drive 312 and/or a removable storage drive2 314, representing a floppy diskette drive, a magnetic tape drive, an optical disk drive, a compact disk drive CD-ROM, DVD, Personal Cloud storage, redundant array of inexpensive disks (RAID) array, etc. The removable storage drive 314 may, e.g., but not limited to, read from and/or write to a removable storage unit 318 in a well-known manner. Removable storage unit 318, also called a program storage device or a computer program product, may represent, e.g., but not limited to, a floppy disk, magnetic tape, optical disk, compact disk, etc. which may be read from and written to by removable storage drive2 314. As will be appreciated, the removable storage unit 318 may include a computer usable storage medium having stored therein computer software and/or data.

In alternative exemplary embodiments, secondary memory 310 may include other similar devices for allowing computer programs or other instructions to be loaded into computer system 300. Such devices may include, for example, but not limited to, a removable storage unit 322 and an interface 320. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 322 and interfaces 320, which may allow software and/or data to be transferred from the removable storage unit 322 to computer system 300.

The computing device 300 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 300 may also include an input device such as, e.g., (but not limited to) a mouse or other pointing device such as a digitizer, touch-based sensor, and/or a keyboard and/oor other data entry device (none of which are labeled).

Computer 300 may also include output devices, such as, e.g., (but not limited to) display 330, and display interface 302. Computer 300 may include input/output (I/O) devices such as, e.g., (but not limited to) communications interface 324, cable 328 and communications path 326, etc. These devices may include, e.g., but not limited to, a network interface card, and modems (neither are labeled). Communications interface 324 may allow software and data to be transferred between computer system 300 and external devices. Examples of communications interface 324 may include, e.g., but may not be limited to, a modem, a network interface (such as, e.g., an Ethernet card), a communications port, a Personal Computer Memory Card International Association (PCMCIA) slot and card, etc. Software and data transferred via communications interface 324 may be in the form of signals 328 which may be electronic, electromagnetic, optical or other signals capable of being received by communications interface 324. These signals 328 may be provided to communications interface 324 via, e.g., but not limited to, a communications path 326 (e.g., but not limited to, a channel). This channel 326 may carry signals 328, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over andy of various physical media, fiber optics, a telephone line, twisted pair, shielded twisted pair, a cellular link, a radio frequency (RF) link, wireless communications, spread spectrum, orthogonal frequency division multiplexing (OFDM), and/or other communications channels, etc.

In this document, the terms "computer program medium" and "computer readable medium" may be used to generally refer to media such as, e.g., but not limited to removable storage drive 314, a hard disk installed in hard disk drive 312, and signals 328, etc. These computer program products may provide software to computer system 300. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 308 and/or the secondary memory 310 and/or removable storage units 314, also called computer program products. Such computer programs, when executed, may enable the computer system 300 to perform the features of the present invention as discussed herein. In particular, the computer programs, when executed, may enable the processor 304 to provide a method to resolve conflicts during data synchronization according to an exemplary embodiment of the present invention. Accordingly, such computer programs may represent controllers of the computer system 300.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, tensorflow and openAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 304, may cause the processor 304 to perform the functions of the invention as described herein. In another exemplary embodiment where the invention may be implemented using software, the software may be stored in a computer program product and loaded into computer system 300 using, e.g., but not limited to, removable storage drive 314, hard drive 312 or communications interface 324, etc. The control logic (software), when executed by the processor 304, may cause the processor 304 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy-based trust platform systems, which can interact, e.g., but not limited to, with computer database management system (DBMS) 307, and/or electronic interactive, graphical user interface (GUI) system. Each of the exemplary DSS, DBMS and/or EIGUI system, can then, using e.g., but not limited to, a cryptographic processor and/or a crypto chip controller processor 336, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove-usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.:

secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (Also Called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

FIG. 4 depicts an example application server and web server network architecture including an example fully meshed, redundant communications network load balancing application server architecture as may be used for an example SmartHub system service provider and/or a digital financial services and/or payment service provider, and may couple client devices such as, e.g., but not limited to, service provider, buyer devices, supplier devices, public blockchain, proxy NFT systems, data repository systems, authentication systems, ledger tracking systems, blockchain distributed ledge systems, NFT systems, SmartPass NFT authentication systems, notification systems, request response systems, financing request systems, collateralized NFT request response systems, etc. to example service devices using an example network infrastructure, according to an example embodiment of the present invention. FIG. 4 depicts an exemplary schematic block diagram 400 illustrating an exemplary communications network device hardware architecture 400 showing exemplary network devices including exemplary application server devices 402, exemplary storage devices 406, web server devices 408, all coupled to an exemplary communications network 404, which may be coupled to other devices such as, e.g., but not limited to, a cyber security network security operations environment device or devices 404, and other end user and other internal and/or external user computing and/or communications devices 410, which may be coupled to the network communications environment 404 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 400 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various block chain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in an example embodiment, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented method of processing multiple digital signatures, criteria for applying the multiple digital signatures, and notaries for at least one digital notarization comprising at least one electronic computer processor coupled to at least one electronic memory storage device and coupled via at least one communications network interface to at least one data communications network, the method comprising:

electronically receiving, by the at least one electronic computer processor, at least one transaction update or electronic request to notarize data or a document;

electronically authenticating, by the at least one electronic computer processor, identity of a requestor of the electronic request by accessing at least one database of the multiple digital signatures of authorized users;

electronically verifying, by the at least one electronic computer processor, a notary authorization status of the requestor;

electronically determining, by the at least one electronic computer processor, if the requestor is authenticated and authorized, based on said electronically authenticating and said electronically verifying, and if so, electronically performing a plurality of processing instructions comprising at least one or more of:

electronically computing, by the at least one electronic computer processor, a hash value for the data or the document;

electronically assembling and electronically generating, by the at least one electronic computer processor, metadata for the data or the document;

electronically receiving, by the at least one electronic computer processor, an electronic digital signature for an approved user for transmittal of the data, the hash and the metadata to at least one blockchain for a notary;

electronically combining and saving, by the at least one electronic computer processor, the hash, the electronic digital signature, and the metadata as a record;

electronically determining if at least one condition for completing the at least one digital notarization of the data or the document have been satisfied;

electronically determining if the data or the document are to be saved, and if determined to be saved, then electronically performing:

a) electronically notarizing, by a local private system, the data or the document via the electronic digital signature and adding a new record to at least one private blockchain, and b) electronically saving, by the at least one electronic computer processor, the data or the document with the electronic digital signature and the metadata in secure storage; or if determined not to be saved proceeding; and electronically determining, by the at least one electronic computer processor, if the data or the document are assigned for an external notary, and if determined to be for an external notary, then electronically performing:

a) electronically generating, by the at least one electronic computer processor, a transaction request including a record in the contents, b) electronically transmitting, by the at least one electronic computer processor, a transaction request to at least one remote digital notarization, c) electronically authenticating, by the at least one electronic computer processor, identity of the requestor for the transaction, and d) electronically determining, by the at least one electronic computer processor, if the requestor is authenticated and authorized, and if so then electronically performing, by the at least one electronic computer processor, at least one digital notarization process on the record, comprising:

electronically verifying, by the at least one electronic computer processor, at least one remote digital notarization at the requestor with the at least one remote digital notarization identifier from the response, and electronically saving, by the at least one electronic computer processor, the at least one remote digital notarization identifier with the record, and if not then electronically generating and electronically transmitting, by the at least one electronic computer processor, a transaction response indicating denial, saving, by the at least one electronic computer processor, a denial status message with the record; or if determined not to be for the external notary, then immediately continuing;

electronically generating, by the at least one electronic computer processor, a transaction response with contents of the identifiers for the first and second notary if required, and status; and electronically transmitting, by the at least one electronic computer processor, the transaction response to the requestor.

2. A system of processing multiple digital signatures, criteria for applying the multiple digital signatures, and notaries for the at least one digital notarization, the system comprising:

at least one electronic computer processor, coupled to at least one electronic memory storage device and coupled via at least one communications network interface, coupled to at least one data communications network, the system comprising wherein said at least one electronic computer processor is configured to:

electronically receive at least one transaction update or electronic request to notarize data or a document;

electronically authenticate identity of a requestor of the electronic request by accessing at least one database of the multiple digital signatures of authorized users;

electronically verify a notary authorization status of the requestor;

electronically determine if the requestor is authenticated and authorized, based on said electronically authenticate and said electronically verify, and if so, configured to perform a plurality of processing instructions comprising being configured to at least one or more of:

electronically compute a hash value for the data or the document;

electronically assemble and generate metadata for the data or the document;

electronically receive an electronic digital signature for an approved user for transmittal of the data, the hash and the metadata to at least one blockchain for a notary;

electronically combine and save the hash, the electronic digital signature, and the metadata as a record;

electronically determine if at least one condition for completing the at least one digital notarization of the data or the document have been satisfied;

electronically determine if the data or the document are to be saved, and if electronically determined to be saved, then being configured to electronically perform:

a) electronically notarize, by a local private system, the data or the document via the electronic digital signature and adding a new record to at least one private blockchain, and b) electronically save the data or the document with the electronic digital signature and the metadata in secure storage; or if electronically determined not to be saved proceeding; and electronically determine if the data or the document are assigned for an external notary, and if electronically determined to be for an external notary, then being configured to electronically perform:

a) electronically generate a transaction request including a record in the contents, b) electronically transmit a transaction request to at least one remote digital notarization, c) electronically authenticate identity of the requestor for the transaction, and d) electronically determine if the requestor is authenticated and authorized, and if so then perform at least one digital notarization process on the record, comprising:

electronically verify the at least one remote digital notarization at the requestor with the at least one remote digital notarization identifier from the response, and electronically save the at least one remote digital notarization identifier with the record, and if not then electronically generate and electronically transmit a transaction response indicating denial, electronically save a denial status message with the record; or if determined not to be for the external notary, then immediately continue;

electronically generate a transaction response with contents of the identifiers for the first and second notary if required, and status; and electronically transmit the transaction response to the requestor.

3. A computer program product embodied on a computer accessible nontransitory storage medium, including at least one instruction, which when executed on at least one electronic computer processor performs a method of processing multiple digital signatures, criteria for applying the multiple digital signatures, and notaries for at least one digital notarization comprising:

electronically receiving at least one transaction update or electronic request to notarize data or a document;

electronically authenticating identity of a requestor of the electronic request by accessing at least one database of the multiple digital signatures of authorized users;

electronically verifying a notary authorization status of the requestor;

electronically determining if the requestor is authenticated and authorized, based on said electronically authenticating and said electronically verifying, and if so, electronically performing a plurality of processing instructions comprising at least one or more of:

electronically computing a hash value for the data or the document;

electronically assembling and electronically generating metadata for the data or the document;

electronically receiving an electronic digital signature for an approved user for transmittal of the data, the hash and the metadata to at least one blockchain for a notary;

electronically combining and saving the hash, the electronic digital signature, and the metadata as a record;

electronically determining if the at least one condition for completing the at least one digital notarization of the data or the document have been satisfied;

electronically determining if the data or the document are to be saved, and if determined to be saved, then electronically performing:

a) electronically notarizing, by a local private system, the data or the document via the electronic digital signature and adding a new record to at least one private blockchain, and b) electronically saving the data or the document with the electronic digital signature and the metadata in secure storage; or if electronically determined not to be saved proceeding; and electronically determining if the data or the document are assigned for an external notary, and if determined to be for an external notary, then electronically performing:

a) electronically generating a transaction request including a record in the contents, b) electronically transmitting a transaction request to at least one remote digital notarization, c) electronically authenticating identity of the requestor for the transaction, and d) electronically determining if the requestor is authenticated and authorized, and if so then electronically performing at least one digital notarization process on the record, comprising:

electronically verifying the at least one remote digital notarization at the requestor with the at least one remote digital notarization identifier from the response, and electronically saving the at least one remote digital notarization identifier with the record, and if not then electronically generating and electronically transmitting a transaction response indicating denial, electronically saving a denial status message with the record; or if electronically determined not to be for the external notary, then immediately continuing;

electronically generating a transaction response with contents of the identifiers for the first and second notary if required, and status; and electronically transmitting the transaction response to the requestor.

4. The method according to claim 1, further comprising: electronically initiating, based on at least one or more of at least one automatic event trigger, or at least one user-driven event trigger, the at least one digital notarization of the data or document on the at least one or more blockchain.

5. The method according to claim 1, further comprising: at least one digital notary function comprising at least one or more of:

at least one hash algorithm, at least one digital signature technology, at least one electronic digital signature technology, at least one secured data storage, or at least one secured document storage; and electronically assigning at least one notary requirement to at least one digital asset in a digital dossier.

6. The method according to claim 1, further comprising at least one or more of:

at least one digital asset;

at least one digital dossier;

at least one notary specification;

at least one notary party group;

at least one event-driven automated notary process;

at least one multi-party automated notary process; or at least one multi-notary notary process.

7. The method according to claim 6, wherein the at least one notary specification comprises at least one or more of:

electronically identifying at least one item in the at least one digital dossier that at least one or more of:

applies a notary, applies digital signature requirements, or applies other notary specification settings; or electronically applying at least one or more of:

the at least one notary specification for a lifecycle of activities for the at least one digital asset, or the at least one notary specification independent of a time duration of a life of the at least one digital asset.

8. The method according to claim 1, wherein the at least one digital notarization comprises at least one or more of:

electronically affirming legitimacy of the multiple digital signatures of parties on the document, electronically affirming validity of the document, electronically ensuring the at least one criteria for completing the at least one digital notarization are followed, electronically ensuring the at least one condition for completing the at least one digital notarization have been completed, wherein the at least one condition is programmed within a Smart Contract that comprise criteria comprising at least one or more of:

a number of the digital signatures required to be complete, or a numeric proportion of total number of the multiple digital signatures necessary to be complete, electronically storing of the executed document, or using at least one electronic blockchain or at least one distributed ledger technology to electronically provide at least one or more of:

a secure electronic method for each event in the transaction;

an event-driven automated electronic process defined by the users;

electronically computing a hashtag value for the asset, data, or document with a unique identifier;

electronically storing at least one new records in a secured and encrypted location;

electronically enabling the digital signature for multiple notaries including within the at least one private blockchain, or at least one local blockchain and at least one public blockchain; and electronically evaluating the criteria for completing the at least one digital notarization.

9. The system according to claim 2, further comprising wherein the system is configured to:

electronically initiate, based on at least one or more of at least one automatic event trigger, or at least one user-driven event trigger, the at least one digital notarization of the data or document on the at least one blockchain.

10. The system according to claim 2, further comprising wherein the system is configured to:

at least one digital notary function comprising at least one or more of:

at least one hash algorithm, at least one digital signature technology, at least one electronic digital signature technology, at least one secured data storage, or at least one secured document storage; and electronically assign at least one notary requirement to at least one digital asset in a digital dossier.

11. The system according to claim 2, further comprising wherein the system is configured to at least one or more of:

at least one digital asset;

at least one digital dossier;

at least one notary specification;

at least one notary party group;

at least one event-driven automated notary process;

at least one multi-party automated notary process; or at least one multi-notary notary process.

12. The system according to claim 11, wherein the at least one notary specification comprises wherein the system is configured to at least one or more of:

electronically identify at least one item in the at least one digital dossier that at least one or more of:

apply a notary, apply digital signature requirements, or apply other notary specification settings; or electronically apply at least one or more of:

the at least one notary specification for a lifecycle of activities for the at least one digital asset, or the at least one notary specification independent of a time duration of a life of the at least one digital asset.

13. The system according to claim 2, wherein the at least one digital notarization comprises configuring the system to at least one or more of:

electronically affirm legitimacy of the multiple digital signatures of parties on the document, electronically affirm validity of the document, electronically ensure the at least one criteria for completing the at least one digital notarization are followed, electronically ensure the at least one conditions for completing the at least one digital notarization have been completed, wherein the at least one condition are programmed within a Smart Contract that comprise criteria comprising at least one or more of:

a number of the digital signatures required to be complete, or a numeric proportion of total number of the multiple digital signatures necessary to be complete, electronically store of the document, or use at least one electronic blockchain or at least one distributed ledger technology to electronically provide at least one or more of:

a secure electronic method for each event in the transaction;

an event-driven automated electronic process defined by the users;

electronically compute a hashtag value for the asset, data, or document with a unique identifier;

electronically store new records in a secured and encrypted location;

electronically enable the digital signature for multiple notaries including within the at least one private blockchain, or at least one local blockchain and at least one public blockchain; and electronically evaluate the criteria for completing the at least one digital notarization.

14. The computer program product according to claim 3, wherein the method further comprises:

electronically initiating, based on at least one or more of at least one automatic event trigger, or at least one user-driven event trigger, the at least one digital notarization of the data or document on the at least one blockchains.

15. The computer program product according to claim 3, wherein the method further comprises:

at least one digital notary function comprising at least one or more of:

at least one hash algorithm, at least one digital signature technology, at least one electronic digital signature technology, at least one secured data storage, or at least one secured document storage; and electronically assigning at least one notary requirement to at least one digital asset in a digital dossier.

16. The computer program product according to claim 3, wherein the method further comprises at least one or more of:

at least one digital asset;

at least one digital dossier;

at least one notary specification;

at least one notary party group;

at least one event-driven automated notary process;

at least one multi-party automated notary process; or at least one multi-notary notary process.

17. The computer program product according to claim 16, wherein the method comprises wherein the at least one notary specification comprises at least one or more of:

electronically identifying at least one item in the at least one digital dossier that at least one or more of:

applies a notary, applies digital signature requirements, or applies other notary specification settings; or electronically applying at least one or more of:

the at least one notary specification for a lifecycle of activities for the at least one digital asset, or the at least one notary specification independent of a time duration of a life of the at least one digital asset.

18. The computer program product according to claim 3, wherein the method comprises wherein the at least one digital notarization comprises at least one or more of:

electronically affirming legitimacy of the multiple digital signatures of parties on the document, electronically affirming validity of the document, electronically ensuring the at least one criterion for completing the at least one digital notarization are followed, electronically ensuring the at least one condition for completing the at least one digital notarization have been completed, wherein the at least one condition are programmed within a Smart Contract that comprise criteria comprising at least one or more of:

a number of the digital signatures required to be complete, or a numeric proportion of total number of the multiple digital signatures necessary to be complete, electronically storing of the document, or using at least one electronic blockchain or at least one distributed ledger technology to electronically provide at least one or more of:

a secure electronic method for each event in the transaction;

an event-driven automated electronic process defined by the users;

electronically computing a hashtag value for the asset, data, or document with a unique identifier;

electronically storing at least one new records in a secured and encrypted location;

electronically enabling the digital signature for multiple notaries including within the at least one private blockchain, or at least one local blockchain and at least one public blockchain; and electronically evaluating the criteria for completing the at least one digital notarization.

19. The method according to claim 1, wherein said electronically receiving the at least one transaction update or electronic request to notarize the data or the document, comprises wherein said electronically receiving comprises:

electronically receiving, by at least one graphical user interface executed by the at least one electronic computer processor, the at least one transaction update or electronic request to notarize the data or the document, via the at least one graphical user interface.

20. The method according to claim 19, wherein said electronically transmitting the transaction response to the requestor comprises wherein said electronically transmitting comprises:

electronically transmitting, by the at least one graphical user interface executed by the at least one electronic computer processor, the transaction response to the requestor, via the at least one graphical user interface.

* * * * *